United States Patent Office 3,822,252
Patented July 2, 1974

3,822,252
3-AZETIDINOLS
Elijah H. Gold, West Orange, N.J., assignor to Schering
Corporation, Bloomfield, N.J.
No Drawing. Continuation of abandoned application Ser.
No. 741,205, June 28, 1968. This application Mar. 20,
1972, Ser. No. 236,508
Int. Cl. C07d 25/00
U.S. Cl. 260—239 A                2 Claims

ABSTRACT OF THE DISCLOSURE

Described herein is the simple compound 3-azetidinol and the 2-monoalkyl and 2,4-dialkyl derivatives thereof. These compounds are useful intermediates in the preparation of other azetidines and are also useful *per se* as mild analgesics.

---

This is a continuation of application Ser. No. 741,205, filed June 28, 1968, now abandoned.

This invention relates to compositions of matter which may be considered chemically as N-alkylated-3-aryl-3-azetidinols and intermediates thereto and to processes for making and using such compositions.

The invention sought to be patented in one of its composition aspects is described as residing in a concept of a chemical compound having the molecular structure of azetidine in which the ring nitrogen atom is alkylated and in which the 3-carbon atom in the ring is substituted by both a phenyl group and a hydroxyl group, said compounds optionally having a lower alkyl radical substituted in each of the 2 and 4 carbon atom positions in the azetidine ring and optionally having substituents on the phenyl nucleus. Also included within this concept are the pharmaceutically acceptable ester and ether derivatives of these 3-hydroxy compounds and the pharmaceutically acceptable acid addition salts of these compounds.

The invention sought to be patented in another of its composition aspects resides in the concept of a chemical compound having a molecular structure of 3-azetidinol and optionally having a lower alkyl radical substituted in each of the 2 and 4 carbon atom positions in the azetidine ring. These compounds can be used as intermediates in the preparation of the aforesaid chemical compounds and are also useful per se as analgesics.

The invention sought to be patented in still another of its composition aspects resides in the concept of a pharmaceutical formulation containing a novel composition of matter of this invention.

The invention sought to be patented in one of its process aspects is described as residing in those concepts which comprise the reaction sequence of the condensation of an epihalohydrin with a substituted benzylamine, followed by removal of the substituted phenylmethyl radical from the condensate to yield the 3-azetidinol, followed by N-acylation and oxidation of the acylate to the corresponding 3-keto-compound, followed by addition thereto of a phenyl-metal compound, and by alkylation of the thus produced 3-phenyl-3-azetidinol.

The invention sought to be patented in another of its process aspects is described as residing in those concepts which comprise reducing pain in a mammal by administering thereto an effective quantity of a novel composition of matter of this invention.

A more specific representation of the tangible embodiments of this invention are the chemical compositions having the structural formula:

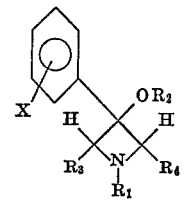

(I)

wherein $R_1$ is lower alkyl, phenyl lower alkyl or lower alkenyl; $R_2$ is hydrogen, lower alkyl or a pharmaceutically acceptable acyl radical; $R_3$ and $R_4$ are hydrogen or lower alkyl and X is hydrogen, fluorine, chlorine, bromine, lower alkyl, hydroxy, lower alkoxy and trifluoromethyl; and pharmaceutically acceptable acid addition salts thereof.

The lower alkyl radicals referred to above (including the alkyl portions of the lower alkoxy radical) may be straight or branched chain and may include, for example, methyl, ethyl, n-propyl, iso-propyl, n-butyl, sec-butyl, iso-amyl, n-hexyl and the like. The term alkyl is also intended to include cycloalkyl radicals such as cyclopropyl, cyclopentyl, cyclohexyl and the like. The phenyl lower alkyl radicals referred to above have a lower alkyl radical attached to the ring nitrogen atom. The phenyl ring may be substituted with various functional groups such as those defined above for X. The lower alkenyl radicals referred to above may be straight or branched chained and may include for example allyl, isopropenyl, isobutenyl, crotonyl, 3-methylbutenyl-1 and cyclopentenyl. Each of these lower alkyl and alkenyl radicals may be functionally substituted, as for example, with a hydroxyl group.

In a preferred subclass of the compounds of this invention, $R_1$ is attached to the ring nitrogen atom through a secondary carbon atom, i.e. where $R_1$ has the formula:

wherein R' and R" are each lower alkyl radicals.

The $R_2$ acyl radicals may be derived from such normally pharmaceutically acceptable acids as monobasic lower alkyl carboxylic acids such as acetic, propionic, butyric and isobutyric; and polybasic organic acids such as succinic, maleic, tartaric and citric acid. The preferred acyl group is a lower alkanoyl radical, i.e. those having 1 to 6 carbon atoms, e.g. formyl, acetyl, propionyl, isobutyryl, valeryl and caproyl.

Other compounds of this invention may be represented by the structural formula:

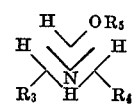

(II)

wherein $R_3$ and $R_4$ above defined; and $R_5$ is hydrogen or a pharmaceutically acceptable acyl radical; and pharmaceutically acceptable acid addition salt thereof. These compounds are useful per se as mild analgesics and are also useful as intermediates in the preparation of the compounds of formula I.

Exemplary of pharmaceutically acceptable acid addition salts of compounds of the formulae I and II are those formed with maleic, fumaric, succinic, tartaric, citric, malic, cinnamic, sulfonic, hydrochloric, hydrobromic, sulfuric, phosphoric, and nitric acids. The acid addition salts may be prepared in the conventional manner by treating a solution or suspension of the free base in an organic solvent with the desired acid, and then recovering the salt which forms by crystallization techniques.

The compounds of formulae I and II can be prepared by condensing an epihalohydrin (III) with a substituted benzyl amine of the formula (IV), followed by removal of the group attached to the nitrogen atom of the condensate V as follows:

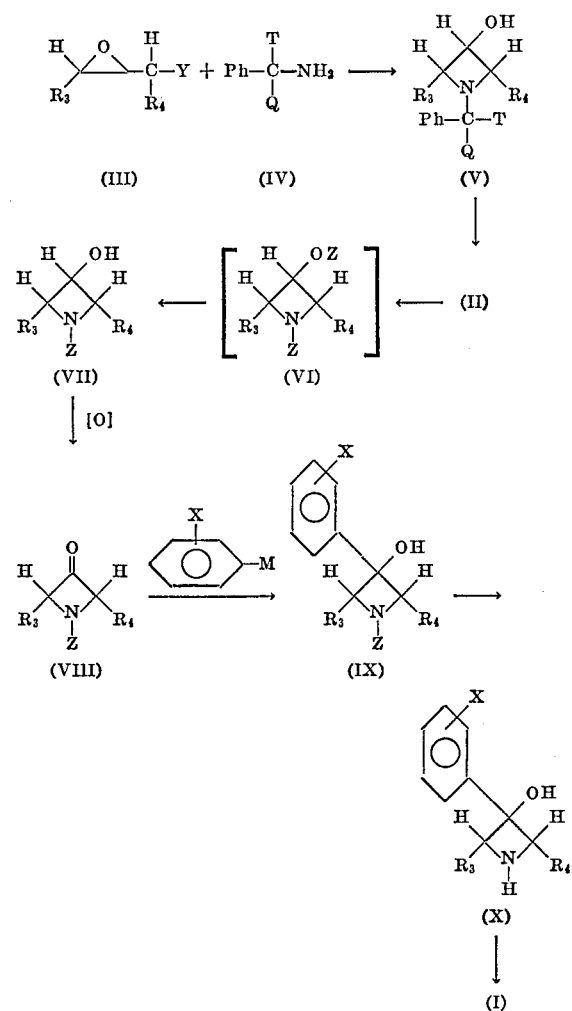

wherein $R_1$, $R_2$, $R_3$, $R_4$ and X have the meanings described above, X is chlorine or bromine, Ph is a phenyl radical, Q is hydrogen, a lower alkyl radical or a phenyl radical, T is a lower alkyl radical or a phenyl radical, M is a reactive metal such as lithium or magnesium and Z is an acyl radical.

The condensation reaction between III and IV is generally conducted in a polar organic solvent such as dimethylformamide, dimethylsulfoxide or methanol. The intermediate aminohalopropanol is preferably not isolated but rather directly cyclized by heating at about 45–50° C. for several days. The resulting condensate V can be converted into the free azetidinol II as, for example, by hydrogenation over a palladium catalyst in a suitable solvent such as ethanol. When III is tritylamine (i.e. Q and T are phenyl), the trityl group can be removed simply by hydrolysis under acid conditions to form the free azetidinol II.

The 3-azetidinols (II) are then N-acylated in the conventional manner as for example with an acyl halide. One may find it convenient to first form the N,O-diacylate (VI) and then remove the O-acyl radical. The N-acylate (III) can be directly formed by adding only one mole of acyl halide to the 3-azetidinol at 0° C. in pyridine solution. Suitable acyl (Z) radicals are those which are readily removable such as benzoyl, tosyl and similar conventional acyl protective groups. The N-acylate (VII) is then oxidized to the corresponding 3-azetidinone (VIII) with a suitable oxidizing agent, as for example, by adding pyridine-sulfur trioxide adduct to a dimethyl sulfoxide solution of VIII. A phenyl-metal compound such as phenylmagnesium bromide can then be added to ketone (VIII) generally at reduced temperature and in an inert solvent and the resultant N-acylated-3-aryl-3-azetidinol (IX) can be deacylated to the free 3-aryl-3-azetidinol (X) by hydrolysis or reduction under appropriate conditions such as hydrogenation in the presence of a 5% Pd/C catalyst.

Compounds of the formula X can be alkylated with the desired $R_1$ moiety in a variety of manners. For example, it can be condensed at ambient temperature with the oxo derivative of $R_1$ in an inert organic solvent such as ethanol to yield the corresponding imine condensate. The latter can be reduced in situ, and may, for example, be conducted catalytically by hydrogenation over a palladium catalyst (5% Pd/C) in a suitable solvent.

Suitable oxo compounds include formaldehyde, acetaldehyde, propionaldehyde, butyraldehyde, acetone, isobutyl methyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl - 3 - pentanone, 3-cyclopentanepropionaldehyde, cyclohexaneacetaldehyde, cycloheptanecarboxaldehyde, 2, 2-dimethylcyclopropylacetaldehyde, 2,2 - dimethylcyclopropyl methyl ketone, cyclopentyl methyl ketone, cyclobutyl methyl ketone, cyclobutanone, cyclohexanone, 4-methylcyclohexanone and the like.

The free 3-phenyl-3-azetidinol (X) can also be alkylated with the corresponding $R_1-Y_1$ wherein $Y_1$ is chlorine, bromine, iodine, the tosylate radical or the like. This reaction is preferably carried out in a polar solvent such as methanol or dimethylformamide and in the presence of a suitable proton acceptor such as potassium carbonate.

In an alternate manner the intermediates of formula X may also be prepared by condensing a phenylepihalohydrin of the formula XI with the benzyl amine III, followed by removal of the group attached to the nitrogen atom in the condensate (XII) as follows:

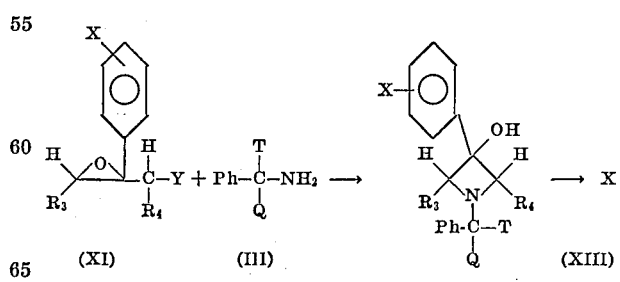

wherein $R_1$, $R_2$, $R_3$, $R_4$, X, Y, Ph, Q and T have the meanings described above.

The compounds of formula I can also be prepared by reacting the arylepichlorohydrin (XI) with β-aminoethylbutyrate (XIII) followed by alkaline hydrolytic elimination at elevated temperatures to the free 3-aryl-3-azetidinol (X) and alkylation with the desired $R_1$ group in the aforesaid manner as follows:

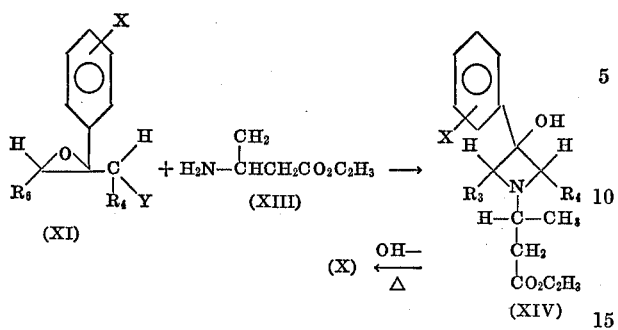

wherein $R_1$, $R_2$, $R_3$, $R_4$, X and Y have the above meanings. As a variation of the above, the compounds of formula I can be directly produced by reacting a corresponding $\beta$-$R_1$-aminoethylbutyrate with the phenylepichlorohydrin (XI) followed by alkaline hydrolytic elimination at elevated temperatures. The $\beta$-$R_1$-aminoethylbutyrate can in turn be formed by reaction of the $R_1$ primary amine ($R_1NH_2$) with ethyl crotonate.

In still another manner as indicated below the compounds of formula I can be prepared by photolytic cyclization of the amino keto acylate of the formula (XV) by irradiation with light having a wavelength greater than 280 m$\mu$. The resultant amide (IX) is then hydrolyzed or reductively cleaved, preferably under basic conditions, to the free azetidinol (X). The latter in turn can be alkylated by any of the aforesaid procedures:

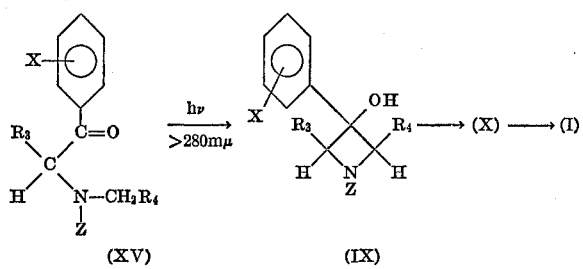

wherein $R_2$, $R_3$, $R_4$, X and Z have the above meaning. Compounds of formula I wherein the $R_1$ group can be produced by reduction of a suitable Z radical can be directly prepared from IX. For example to directly produce the compounds of formula I wherein $R_1$ is benzyl, the acyl group Z can be benzoyl and the desired compounds can be produced directly by standard reduction methods, e.g. lithium aluminum hydride in tetrahydrofuran.

The following non-limiting examples illustrate the preparation of representative compounds of this invention:

EXAMPLE 1

Preparation of 3-azetidinol

Stir a solution of 49.5 g. of $\alpha$-phenylethylamine, 37.5 g. of epichlorohydrin and 90 g. of dimethyl sulfoxide at room temperature for 24 hours and then at about 50° C. for seven days. Add 200 ml. of 10% aqueous sodium hydroxide to the cooled solution, extract the mixture three times with 150 ml. portions of ether, wash the combined ether extract three times with 150 ml. portions of water, dry over sodium sulfate, filter, remove the ether in vacuo and distill the residue (b.p.$^{0.2}$=106–107° C.) to obtain 28 g. of 1-($\alpha$-phenethyl)-3-azetidinol, m.p.=65–69.5° C. In a Parr shaker, under about 50 lbs./in.$^2$ of hydrogen and in the presence of 50 g. of 5% palladium on carbon, shake a solution of 25 g. of this product in 125 ml. of absolute ethanol for three days, after which approximately 60% of the theoretical amount of hydrogen is absorbed. Filter, wash well with ethanol and remove the solvent in vacuo. To the residual oil, add 225 ml. of ether and obtain 2.8 g. of the ether-insoluble 3-azetidinol. Sublimation at 80° C. (0.01 mm.) affords analytically pure 3-azetidinol, m.p.=113–116° C.

EXAMPLE 2

Preparation of 1-methyl-3-phenyl-3-azetidinol

To a stirred cooled solution of 5.0 g. of 3-azetidinol in 100 ml. of dry pyridine add dropwise 21 g. of benzoyl chloride at a rate that maintains the temperature at about 20° C. and then stir for three hours at room temperature. Pour onto 100 g. of ice, add water to bring the total volume of the mixture to 600 ml. Saturate with sodium chloride extract three times with 150 ml. portions of ether, wash the combined ether extract twice with 250 ml. portions of 10% sulfuric acid and four times with 150 ml. portions of water. Dry over sodium sulfate, filter, remove the ether in vacuo and obtain 21 g. of 1-benzoyl-3-benzoyl-oxyazetidine as a viscous oil (upon purification M.P. =71.5–73° C.).

To a cooled stirred solution of this crude product in 100 ml. of methanol, add dropwise over 20 minutes 4.0 g. of KOH in 100 ml. of methanol and stir overnight in an ice bath. Neutralize with hydrochloric acid, remove the solvent in vacuo, add 50 ml. of 10% aqueous sodium carbonate, saturate with sodium chloride, extract four times with chloroform, dry over sodium sulfate, filter and remove the solvent in vacuo. Remove the methyl benzoate by distillation (b.p.$^{0.91}$=27–29°) and collect 3.7 g. of crude 1-benzoyl-3-azetidinol (b.p.$^{0.01}$-160–175° C.—upon purification, m.p.=62–63° C.).

Stir 2.5 g. of this product together with 21 g. of triethylamine in 35 ml. of dimethylsulfoxide, and add rapidly dropwise a suspension of 7.0 g. of pyridine sulfur trioxide in 35 ml. of dimethylsulfoxide and stir for 15 minutes. Remove most of the dimethylsulfoxide in vacuo at 60° and chromatograph the residue on 100 g. of silica gel, elute with chloroform, collect the front running yellow band and obtain 2.4 g. of crude 1-benzoyl-3-azetidinone as an oily solid (upon purification m.p.=101–101.5° C.).

To a stirred solution of 1.8 g. of this product in 20 ml. of ether at −30° C. add slowly dropwise 11 ml. of 0.1 N phenylmagnesium bromide in ether. Stir 10 minutes more, decompose with 15 ml. of 10% aqueous ammonium chloride, remove the ether phase and extract the aqueous phase twice with 40 ml. portions of ether. Dry the combined ether extract over sodium sulfate, filter, remove the ether in vacuo and obtain 2.0 g. of 1-benzoyl-3-phenyl-3-azetidinol.

Reflux for 2 hours a solution of 2 g. of 1-benzoyl-3-phenyl-3-azetidinol in 20 ml. of a 1:1 ethanol-water mixture containing 8 g. of sodium hydroxide. Add 80 ml. of a saturated aqueous sodium chloride solution, extract three times with 50 ml. portions of ether, dry over sodium sulfate, dry, remove the ether in vacuo and obtain 0.6 g. of 3-phenyl-3-azetidinol, m.p.=154–156° C.

In a Parr shaker, under about 50 lbs./in.$^2$ of hydrogen and in the presence of 0.5 g. of 5% palladium on carbon, shake a solution of 8.09 g. of 3-phenyl-3-azetidinol and 8.0 g. of 37% aqueous formaldehyde in 40 ml. of glacial acetic acid for 1.5 hours. Filter, add 150 ml. of water and then, with cooling and stirring, add 70 g. of 50% aqueous sodium hydroxide. Extract this mixture four times with 100 ml. portions of ether in vacuo and distill the residue (b.p.$^{0.05}$=85–86° C.) to obtain 8.1 g. of the analytically pure 1-methyl-3-phenyl-3-azetidinol, m.p.=57–58° C. (Cf. R. A. Clasen, Dissertation, Kansas State University, 1966, and R. A. Clasen and S. Searles, Jr., *Chem. Comm.*, 1966, pp. 289–290.)

EXAMPLE 3

Preparation of 1-ethyl-3-phenyl-3-azetidinol

To a stirred solution of 4.9 g. of 3-phenyl-3-azetidinol in 60 ml. of dry pyridine at 0–5° C., add 5.7 g. of acetyl chloride and then stir for three hours at room temperature. Pour into 800 ml. of ice-water, saturate with sodium chloride and extract three times with 200 ml. portions of chloroform. Wash the combined chloroform extract twice with 150 ml. portions of 10% sulfuric acid, once with 100 ml. of saturated aqueous sodium chloride, dry over sodium sulfate, filter, remove the solvent in vacuo and obtain 6.1 g. of crude 1-acetyl-3-acetoxy-3-phenylazetidine. Add an ethereal solution of this compound dropwise to a stirred mixture of 11.6 g. of lithium aluminum hydride in 150 ml. of ether at 5–12° C., and then reflux the mixture for eight hours. Cool and under a nitrogen atmosphere, carefully decompose the excess lithium aluminum hydride with 60 ml. of 20% aqueous ammonium chloride. Filter through celite, wash well with ether, remove the aqueous phase, dry over sodium sulfate, filter and adjust the volume to about 450 ml. With stirring add 16 ml. of 3.5N ethereal hydrogen chloride, stir overnight, filter and obtain 7.3 g. of the crude hydrochloride salt of the product of this example, m.p.=165–168° C. (decomp.). Crystallization from acetonitrile-methanol affords analytically pure 1-ethyl-3-phenyl-3-azetidinol, m.p.=182–182.5° C.

EXAMPLE 4

Preparation of 1-isopropyl-3-phenyl-3-azetidinol

Stir a solution of 7.1 g. of isopropylamine, 20 g. of phenylepichlorohydrin [J. Org. Chem., 27, 2241 (1962)] and 27 g. of dimethylsulfoxide at room temperature for 24 hours and then at about 45° C. for seven days. To the cooled solution add 170 ml. of 7% aqueous sodium hydroxide, extract this mixture four times with 100 ml. portions of ether, wash the combined ether extract 3 times with 100 ml. portions of water, dry over sodium sulfate, filter and remove the ether in vacuo. Crystallize from hexane and obtain 8.7 g. of 1-isopropyl-3-phenyl-3-azetidinol, m.p. 83–86° C. Recrystallize from hexane to provide an analytical sample, m.p. 86–87° C.

EXAMPLE 5

Preparation of 1-isopropyl-3-phenyl-3-propionoxyazetidine

Stir 12.7 g. of 1-isopropyl-3-phenyl-3-azetidinol and 13.0 g. of propionic anhydride at 105–110° for two hours. Remove the excess anhydride in vacuo, dissolve the residue in 50 ml. of ether, wash once with 25 ml. of 10% aqueous sodium carbonate and once with 25 ml. of water. Dry the ether solution over sodium sulfate, remove the ether and distill the residue (b.p.$^{0.1}$=103° C.) to obtain 14.5 g. of the 1-isopropyl-3-phenyl-3-propionoxyazetidine.

EXAMPLE 6

Preparation of 1-cyclopropyl-3-phenyl-3-azetidinol

Stir a solution of 25 g. of cyclopropylamine, 68 g. of phenylepichlorohydrin and 98 g. of DMSO at room temperature for 24 hours and then at 45–50° C. for eleven days. To the cooled solution add 200 ml. of 10% aqueous sodium hydroxide, extract this mixture three times with 100 ml. portions of water, dry over sodium sulfate, filter and remove the ether in vacuo. Distill the residual oil and collect 32 g. of the product of this example boiling at 94–95° (0.05). Recrystallize the distillate from hexane and obtain 21 g. of the desired material, m.p.=57–58° C.

EXAMPLE 7

Preparation of 1-benzyl-3-phenyl-3-azetidinol

In a nitrogen atmosphere, using a Hanovia 450 watt medium pressure ultraviolet lamp in a water cooled Pyrex immersion well, internally irradiate 16 g. of N-methyl-α-benzamidoacetophenone [J. Am. Chem. Soc., 78, 1941 (1056)] dissolved in 2.3 l. of ether, with stirring for 15 hours. Filter the solution and chromatograph the crude product, after removing most of the solvent, on 900 g. of silica gel. Wash the column with about 6 l. of chloroform and then elute the desired product with 3% methanol in chloroform (containing 0.75% ethanol) and obtain 9.4 g. of solid 1-benzoyl-3-phenyl-3-azetidinol (upon purification, m.p. 101.5–103.5° C.).

To a stirred mixture of 3.8 g. of lithium aluminum hydride in 100 ml. of ether at 15–20° C., add dropwise a solution of 6.6 g. of 1-benzoyl-3-phenyl-3-azetidinol in 220 ml. of a dry 10:1 ether-tetrahydrofuran mixture. After addition is complete reflux the mixture for three hours, cool, and under a nitrogen atmosphere decompose the excess lithium aluminum hydride with 30 ml. of 20% aqueous ammonium chloride. Filter through Celite, wash well with ether, remove the aqueous phase from the filtrate, dry over sodium sulfate, filter and adjust the volume of the resulting ethereal solution to about 200 ml. With stirring add 5 ml. of 3.5 N ethereal hydrogen chloride, stir overnight, filter and obtain 6.0 g. of the crude hydrochloride salt of 1-benzyl-3 - phenyl-3 - azetidinol, m.p.=170–172°. Crystallization from ethyl acetate-methanol affords analytically pure material, m.p.=187.5–188.5° C.

EXAMPLE 8

3-phenyl-3-azetidinol

Stir 21.6 g. of α-phenlyethylamine, 30.0 g. of phenylepichlorohydrin and 53 g. of dimethylsulfoxide at room temperature for 24 hours and then at about 50° C. for ten days. Add 100 ml. of 10% aqueous sodium hydroxide to the cooled solution, extract the mixture three times with 100 ml. portions of ether, wash the combined ether extract three times with 100 ml. portions of water, dry over sodium sulfate, filter, remove the ether in vacuo, crystallize from hexane and obtain 16 g. of 1-(α -phenethyl) - 3-phenyl-3-azetidinol, m.p.=89–90° C. Further crystallization from hexane affords an analytical sample, m.p.=89.5–90.5° C.

In a Parr shaker, under about 50 lbs./in.$^2$ of hydrogen and in the presence of 50 g. of 5% palladium on carbon, shake a solution of 86.8 g. of 1-(α-phenethyl)-3-phenyl-3-azetidinol, 26.0 ml. of 36% hydrochloric acid in 600 ml. of absolute ethanol for four days. Filter, remove the solvent in vacuo, dissolve the residue in 500 ml. of water, add 75 ml. of 50% aqueous sodium hydroxide, extract successively with a 500 ml., a 300 ml., a 200 ml., and a 150 ml. portion of ether. Partially dry over sodium sulfate, filter, remove the ether in vacuo, add 100 ml. of benzene, remove the excess water by azeotropic distillation and then remove the remaining benzene in vacuo. To the oily solid add 300 ml. of etther and filter the 8.4 g. crude 3-phenyl-3-azetidinol, m.p.=152–154° C. Recrystallize from a 40:1 benzene-methanol mixture and obtain an analytical sample, m.p.=157–158.5° C.

Using the above-described methods and employing analogous reagents, one can similarly prepare the other compounds of this invention. For example, using epihalohydrins or other starting materials wherein $R_3$ and/or $R_4$ are methyl, one can prepare the corresponding 1-alkylated-2-methyl-3-phenyl-3-azetidinols and 1-alkylated-2,4-dimethyl-3-phenyl-3-azetidinols.

One can prepare the acyl derivatives by conventional acylation of the corresponding azetidinol, e.g. with acetic anhydride, and similarly the alkoxy derivatives by conventional etherification procedures, e.g. with methyl iodide.

Using standard techniques and procedures, the efficacy and toxicity of the compounds of this invention were studied in rats with favorable results. From such tests as the rat yeast paw test as described in Randell and Selitto "A Method of Measurement of Analgesic Activity on Inflamed Tissue," Arch Int. Pharmacodyn. Ther., Vol. 109, page 409 (1957), the effective analgesic dosage of the active ingredient of the compositions of this invention is considered to be within the range of 1 to 20 mgs. per kg. of mammalian body weight. This dosage can be given once daily or can be divided and taken at given intervals during the day. In each specific instance, however, the attending diagnostician will determine the dosage, amount and frequency taking into account related health factors of the subject.

The compounds of this invention may be administered as such or together with suitable carriers which are pharmaceutically acceptable. A carrier is selected according to the route of administration to be used as well as according to the physical properties of the compounds and standard pharmaceutical practice. In a preferred embodiment the compositions of this invention are administered orally, although parenteral administration is also effective and within the scope of this invention. Such preparations may be in solid forms, as for example tablets and capsules, or in liquid forms, as for example syrups, elixirs, emulsions, and injectables.

In the formulations of pharmaceutical preparations there can be employed such substances which do not react with the compounds, as for example, water, gelatin, lactose, starches, magnesium stearate, talc, vegetable oils, benzyl alcohols, gums, polyalkylene glycols, and petroleum jelly.

The following examples show typical tablet, elixir and capsule formulations incorporating the tangible embodiments of this invention. The formulations are illustrative merely and no limitation is intended.

EXAMPLE 9

ELIXIR FORMULATION

Formula

| Ingredient | Grams per liter |
|---|---|
| 1-isopropyl-3-phenyl-3-azetidinol hydrochloride | 20 |
| Sodium citrate, USP | 10 |
| Sodium benzoate, USP | 1 |
| Sorbitol solution, USP | 200 |
| Propylene glycol, USP | 50 |
| Sucrose, food grade | 600 |
| Peppermint oil, 0.1 ml. | |
| Purified water, USP, q.s. to 1.0 liter. | |

Dissolve successively the sodium citrate, sodium benzoate, 1-isopropyl-3-phenyl-3-azetidinol hydrochloride in approximately 300–400 ml. of purified water with gentle warming and agitation. Add to the clear solution the sorbitol solution, propylene glycol and sucrose and agitate until homogeneous. Cool the batch to room temperature and add the peppermint oil flavor. Add 5 gms. of a suitable filter aid (Hi Flow Super Cel—Johns Mansville) and filter the solution. Bring the solution up to final volume (1.0 liter) with additional purified water. Bottle the syrup in suitably sized containers. Each teaspoon (5 ml.) of this formulation delivers 100 mg. of the active azetidinal.

EXAMPLE 10

TABLET FORMULATION

| Ingredient | Quantity (grams) |
|---|---|
| 1-isopropyl-3-phenyl-3-azetidinol | 100 |
| Lactose | 400 |
| Corn starch | 240 |
| Corn starch as 10% paste | 20 |

Mix the 1-isopropyl-3-phenyl-3-azetidinol, lactose and corn starch, and pass through a pulverizing mill if necessary. Granulate the mix with the starch paste and add additional water if necessary to make a damp granulation. Pass the granulation through an impact mill to produce 8–12 mesh granules. Spread the granulation on trays and dry in a draft-oven at 35–40° C. Reduce the dried granulation to 16–24 mesh. Blend the foregoing 760 grams of "wet" granulation with 32 gm. of corn starch and 80 g. of magnesium stearate until a uniform mixture is obtained. Compress into tablets of 500 mg. of which contains 62.5 mg. of the active ingredient.

EXAMPLE 11

CAPSULE FORMULATION

| Ingredient | Quantity (grams) |
|---|---|
| 1-isopropyl-3-phenyl-3-azetidinol hydrochloride | 400 |
| Lactose | 1590 |
| Magnesium stearate | 10 |

Mix the active ingredient with the lactose and blend in the magnesium stearate. Fill hard gelatin capsules with 500 mg. each of the blended mixture to produce capsules containing 100 mg. of 1-isopropyl-3-phenyl-3-azetidinol hydrochloride.

Numerous other variants will be apparent to one skilled in the art within the spirit of the present invention.

I claim:

1. A compound of the formula

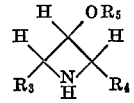

wherein $R_3$ and $R_4$ are hydrogen or lower alkyl and $R_5$ is hydrogen.

2. A compound according to claim 1 wherein $R_3$ and $R_4$ are hydrogen.

References Cited

UNITED STATES PATENTS

| 3,481,920 | 12/1969 | Hargrove | 260—239 |
| 2,878,264 | 3/1959 | Lunsford | 260—326.5 R |

OTHER REFERENCES

Chatterjee et al., Chem. Commun., 1968, p. 93.
Clasen et al., Chem. Commun., 1966, pp. 289–290.
Testa et al., Liebigs Ann. Des. Chem., vol. 671, pp. 106–108 (1964), QD1L7.
Gaertner, Tetrahedron Letters, No. 39, pp. 4691–4694 (1966), QD241J6.

ALTON D. ROLLINS, Primary Examiner

U.S. Cl. X.R.

424—244